United States Patent [19]

Chen

[11] Patent Number: 5,060,368
[45] Date of Patent: Oct. 29, 1991

[54] APPARATUS FOR ASSEMBLING PLASTIC CASES FOR CASSETTE TAPES

[76] Inventor: Senda Chen, No. 33, Jung Hsing Rd., Pa Te Hsiang, Tao Yuan Hsien, Taiwan

[21] Appl. No.: 601,309

[22] Filed: Oct. 22, 1990

[51] Int. Cl.⁵ .......................... B29C 6/02; B29F 1/14
[52] U.S. Cl. ...................................... 29/793; 29/797; 29/434; 29/453
[58] Field of Search ................. 29/453, 434, 773, 797; 53/428, 448, 11 R, 244

[56] References Cited

U.S. PATENT DOCUMENTS

| | | | |
|---|---|---|---|
| 3,393,444 | 7/1968 | Peters et al. | 29/453 X |
| 3,477,095 | 11/1969 | Lensky | 29/453 X |
| 4,012,827 | 3/1977 | Abrams | 29/453 |
| 4,351,630 | 9/1982 | Hayberg et al. | 29/453 X |
| 4,543,702 | 10/1985 | Wada | 29/434 |
| 4,696,087 | 9/1987 | Mizuta | 29/434 |
| 4,800,703 | 1/1989 | Goodman | 53/244 X |
| 4,852,327 | 8/1989 | Kurkowski et al. | 29/453 X |

Primary Examiner—Horace M. Culver
Attorney, Agent, or Firm—Ross, Howison, Clapp & Korn

[57] ABSTRACT

An apparatus for assembling plastic cases consisting of a male case member and a female case member for cassette tapes comprising a robot for removing the male and female case member for an injection mold to an assembling position and assembling the male and female case members. The robot has an arm having a sucker assembly consisting of an upper sucker seat and a lower sucker seat. A plurality of suckers are provided on the upper and lower sucker seats. The suckers are controlled by a plurality of air cylinders in the upper and lower sucker seats to selectively retain the male and female case members on the sucker seats or release the cases members from the sucker seats. Two parallel, vertical holding arms are respectively provided adjacent to both sides of each sucker seat. Two vertical rails are formed on the arm between the upper sucker seat and the lower sucker seat. The upper sucker seat is movable along the vertical rails under the control of an actuating bar provided on the upper sucker seat. The lower sucker seat is articulated to the arm at a lower portion thereof.

1 Claim, 9 Drawing Sheets

FIG_12_
PRIOR ART

FIG. 13.
PRIOR ART 5,060,368

APPARATUS FOR ASSEMBLING PLASTIC CASES FOR CASSETTE TAPES

BACKGROUND OF THE INVENTION

The present invention relates to an apparatus for assembling plastic cases for cassette tapes.

Figure 10:
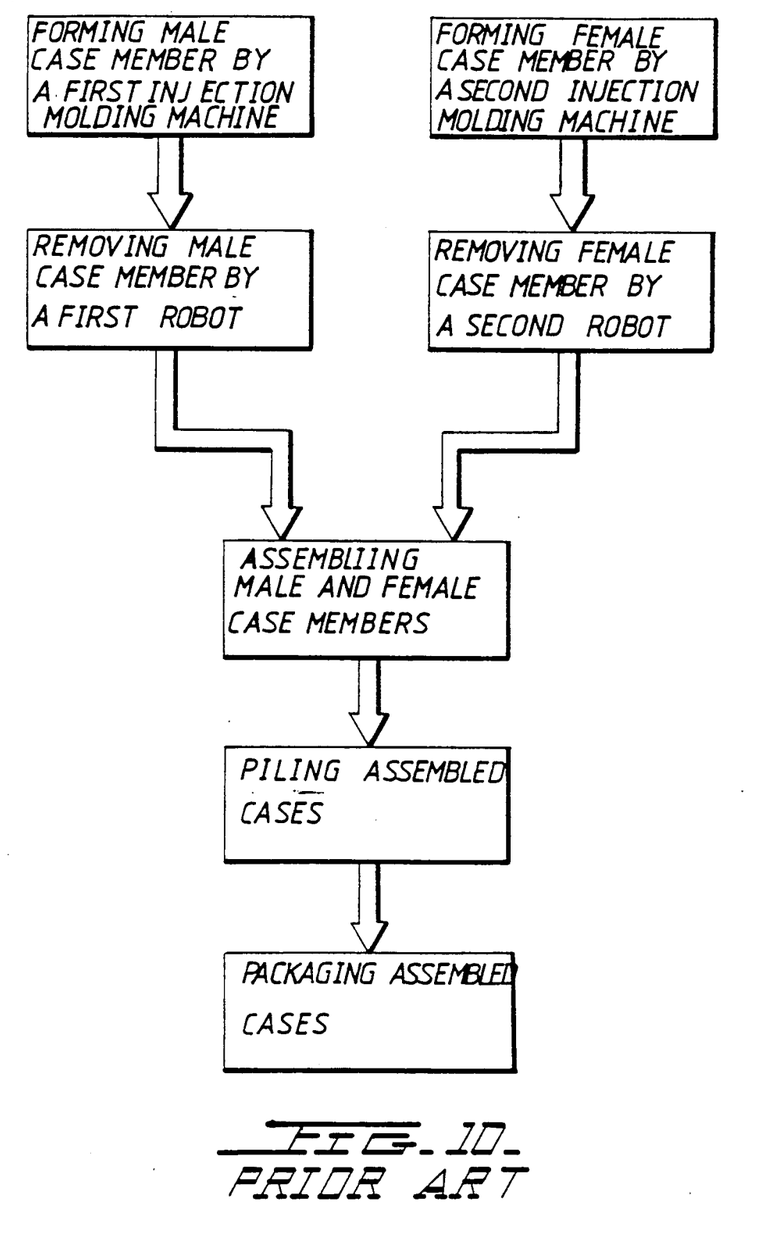
FIG. 10 is a conventional flow chart for forming and assembling plastic cases for cassettes.
Figure 11:
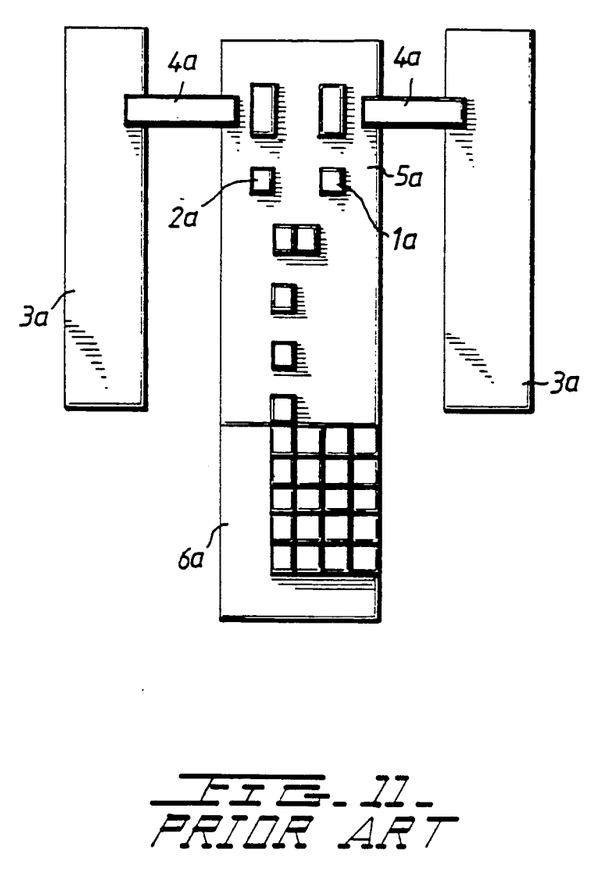
FIG. 11 is a schematic view showing the disposition of a conventional apparatus for forming and assembling conventional plastic cases.

Plastic cases for cassettes, compact disks (CD) or the like are widely applied. A plastic case generally comprises a male case member and a female case member pivotally jointed together to form an openable case for receiving a cassette or CD therein. FIG. 10 of the drawings shows the flow chart for producing and assembling the case and FIG. 11 shows the mechanical layout. First, two injection molding machines 3a are utilized to respectively form the male case member 1a and the female case member 2a. Then, the two case members 1a and 2a are removed from the injection molding machines 3a by being sucked by suckers on two robots 4a under the control of computer programs. After that, the two case members 1a and 2a are placed and positioned on an assembling machine 5a to complete the assembly of the case. After assembly, the case moves to a case piling area to be subsequently packaged in boxes.

Figure 12:
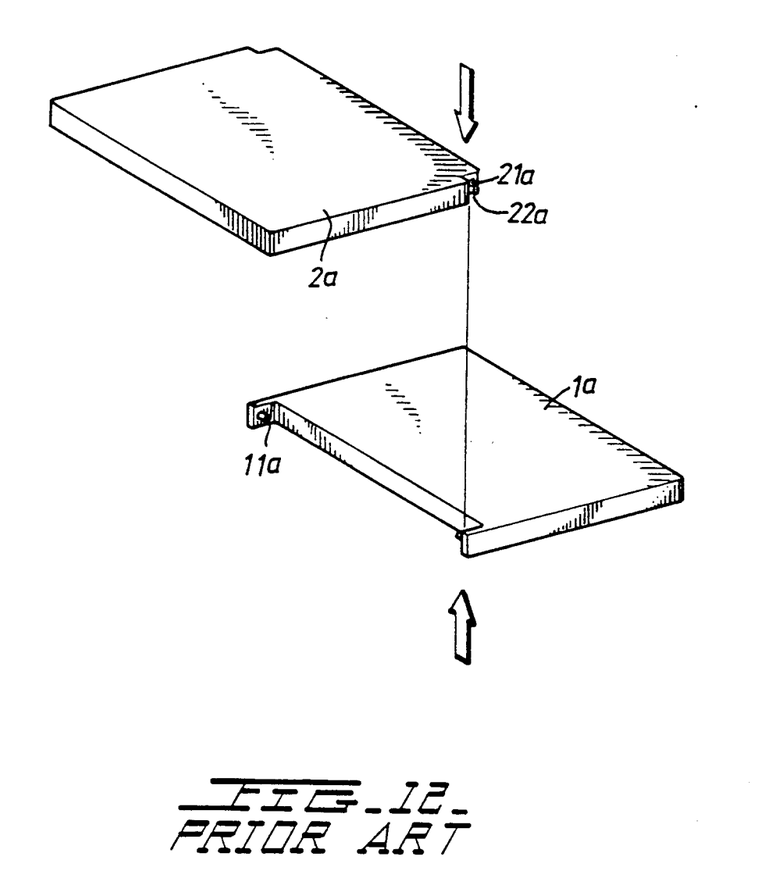
FIG. 12 is an exploded perspective of a conventional plastic cases.

FIG. 12 shows the assembly of the male case member 1a and the female case member 2a. The male member 1a has two nubs 11a for engaging two corresponding grooves 21a on the female case member 2a to form a pivotable case. For the assembling purpose, each groove has a longitudinal guiding path 22a extending therefrom for guiding the nubs 11a to enter the grooves 21a, facilitating assembly.

However, the assembling machine 5a requires a complicated design in order to precisely assemble the male and female case members and to control the displacement of the holders, which leads to a high cost. Furthermore, two injection molding machines and two robots are required for respectively forming and assembling the male and female case member, which results in more required space and additional cost.

The present invention provides an apparatus for assembling plastic cases to mitigate and/or obviate the above-mentioned problems.

SUMMARY OF THE INVENTION

It is an object of the present invention to provide an apparatus for assembling plastic cases for cassettes in which an improved assembling head is utilized.

It is another object of the present invention to provide an apparatus for assembling plastic cases for cassettes in which small space is required for installation.

It is still another object of the present invention to provide an inexpensive apparatus for forming and assembling plastic cases for cassettes.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
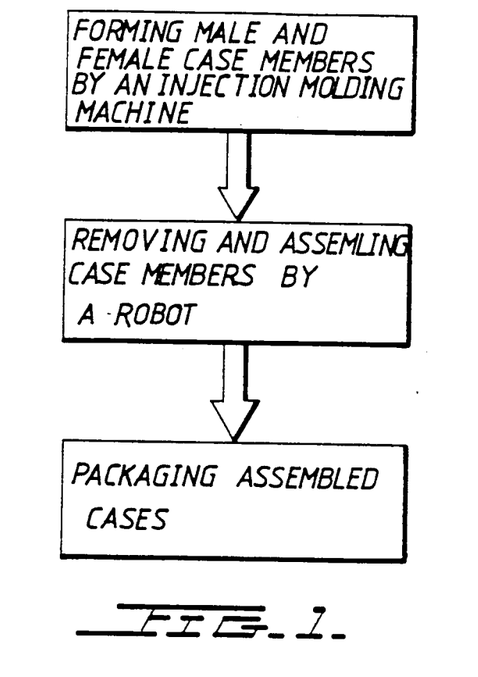
FIG. 1 is a flow chart showing the forming and assembling of the plastic cases according to the present invention.
Figure 2:
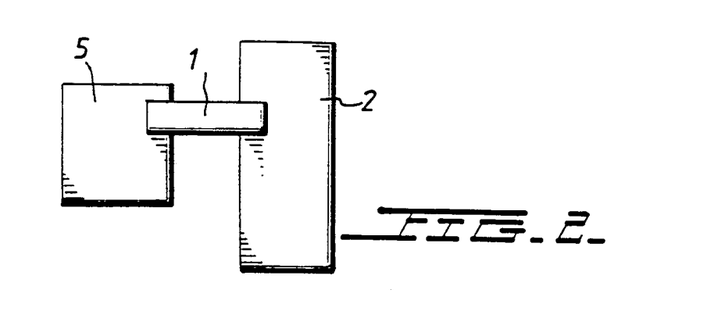
FIG. 2 is a schematic view showing the disposition of the apparatus for forming and assembling the plastic cases according to the present invention.
Figure 5:
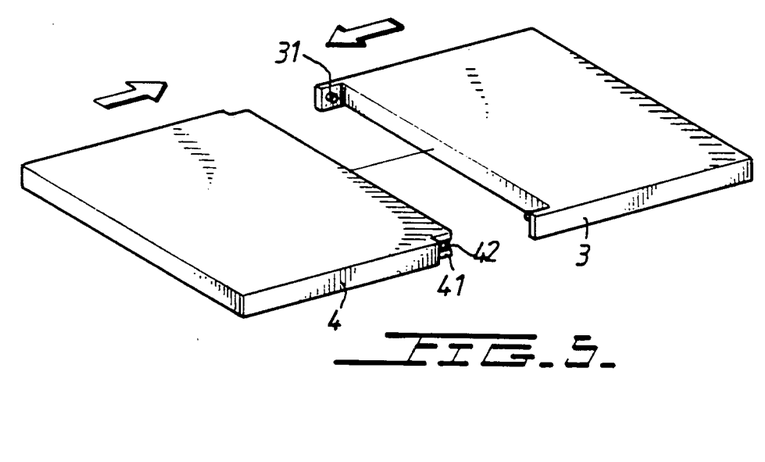
FIG. 5 is an exploded perspective view showing a plastic case according to the present invention.
Figure 13:
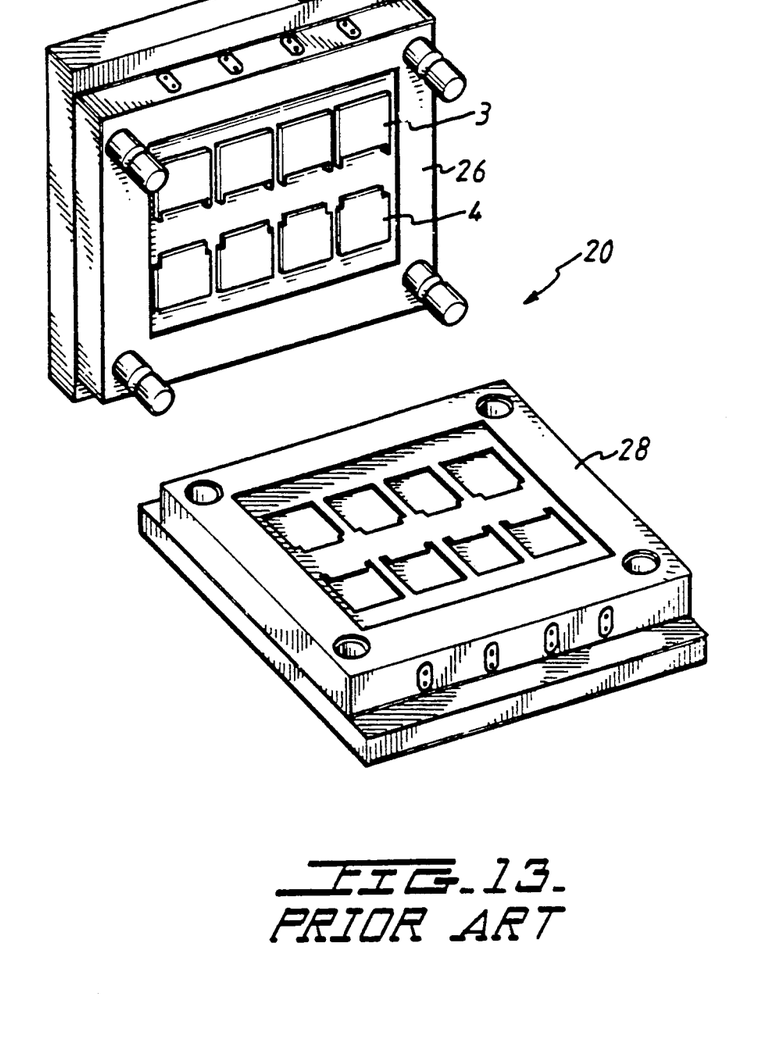
FIG. 13 is a schematic view showing an injection mold utilized in the present invention.

Referring to FIGS. 1, 2 and 5, according to the present invention, an injection molding machine 2 is used to produce plastic cases in an injection mold 20 (not shown in FIG. 2, but is shown in FIG. 13), and a robot 1 is used to remove the plastic cases from the injection mold. The plastic case comprises a male case member 3 and a female case member 4 which are simultaneously formed in the injection mold 20. After formation, the male case member 3 and the female case member 4 are removed from the injection molding machine 2 and assembled by the robot 1. Reference character 5 represents a packaging device for gathering and packaging assembled cases which is so conventional that no further description is required.

According to the present invention, the method for producing and assembling plastic cases comprises the following steps (the flowchart of FIG. 1): (a) forming a male case member and a female case member in an injection mold by means of an injection molding machine; (b) sucking and assembling the male case member and the female case member by a robot; and (c) packaging the assembled plastic cases in a packaging means.

Figure 3:
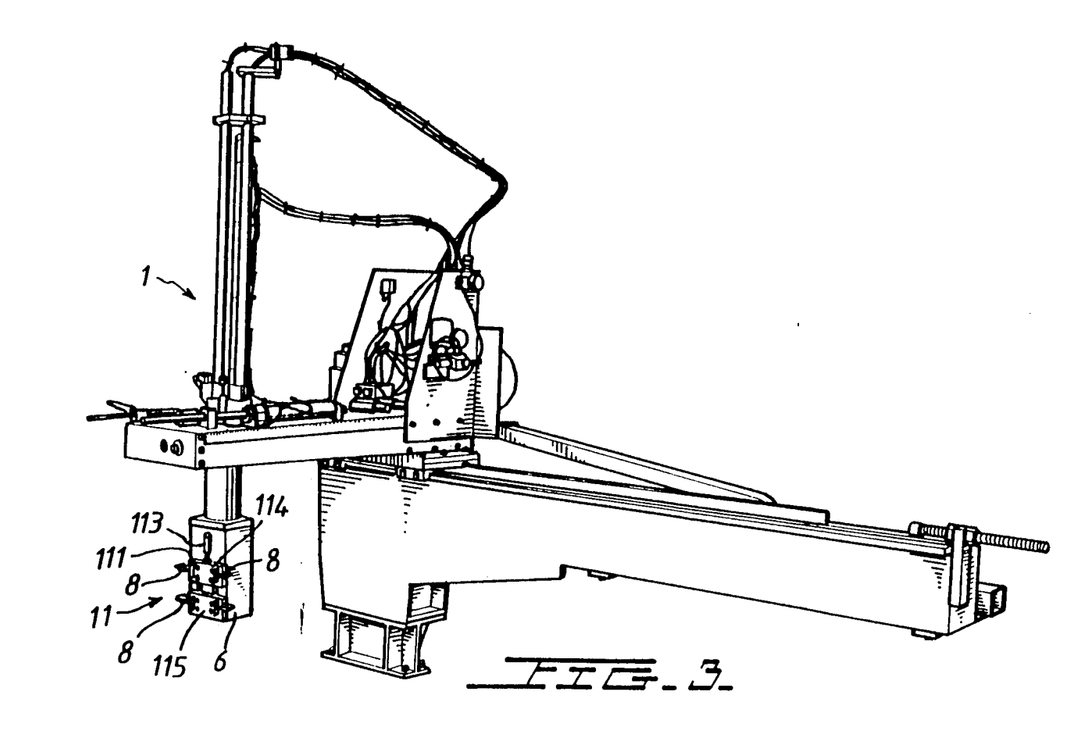
FIG. 3 is a perspective view of a robot according to the present invention.
Figure 4:
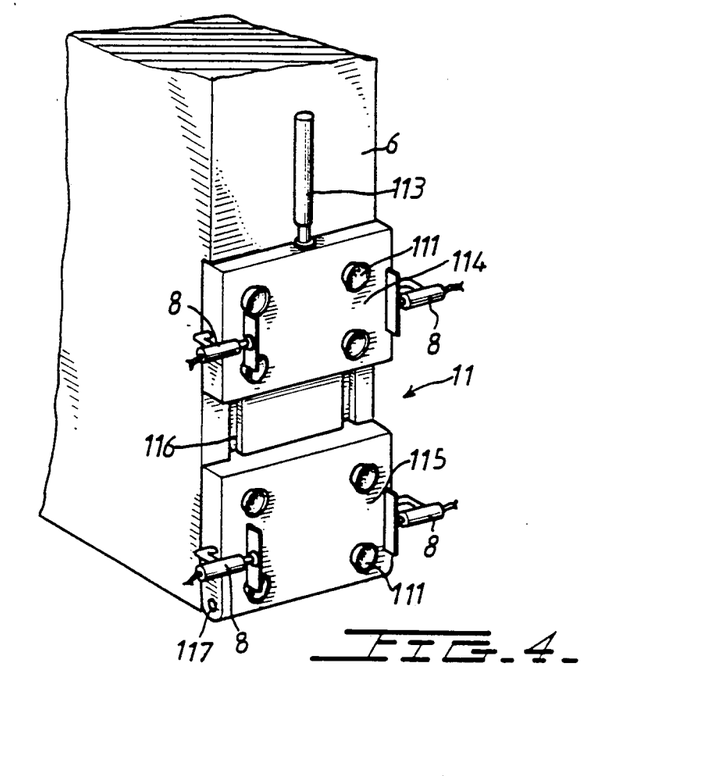
FIG. 4 is a schematic perspective view showing the sucker assembly on the arm of the robot.

Referring to FIGS. 3 and 4, the robot 1 includes an arm 6 having a sucker assembly 11 consisting of an upper sucker seat 114 and a lower sucker seat 115. A plurality of suckers 111 are provided on the upper and lower sucker seats 114 and 115. The suckers 111 are controlled by a plurality of air cylinders (not shown) in the upper and lower sucker seats 114 and 115 in the arm 6, in order to selectively retain the male and female case members 3 and 4 on the sucker seats 114 and 115 (by means of suction), or release the cases members 3 and 4 from the sucker seats 114 and 115.

As best shown in FIG. 4, on each sucker seat 114 and 115, there are two parallel vertical holding arms 8 respectively provided adjacent to both sides of the sucker seats 114 and 115, which will be described in detail later. On the arm 6 of the robot 1, there are two vertical rails 116 formed between the upper and the lower sucker seats 114 and 115. The upper sucker seat 114 is movable along the vertical rails 116 under the control of an actuating bar 113 provided on the top of the upper sucker seat 114. The lower sucker seat 115 is articulated to the arm 6 at 117. The robot 1 is controlled by computer programs such that linear displacement, angular displacement, rotation, and return stroke thereof may be precisely pre-set, in order to accomplish the suction and assembly of the case members.

Referring to FIG. 5, the male case member 3 has two oppositely disposed nubs 31, and the female case member 4 has two complimentary grooves 41 (only one of the grooves is shown). In addition, in order to match the operation of the assembly, each groove 41 has a guiding path 42 extending therefrom parallel to the moving direction of the movable upper case member during assembly.

Figure 6:
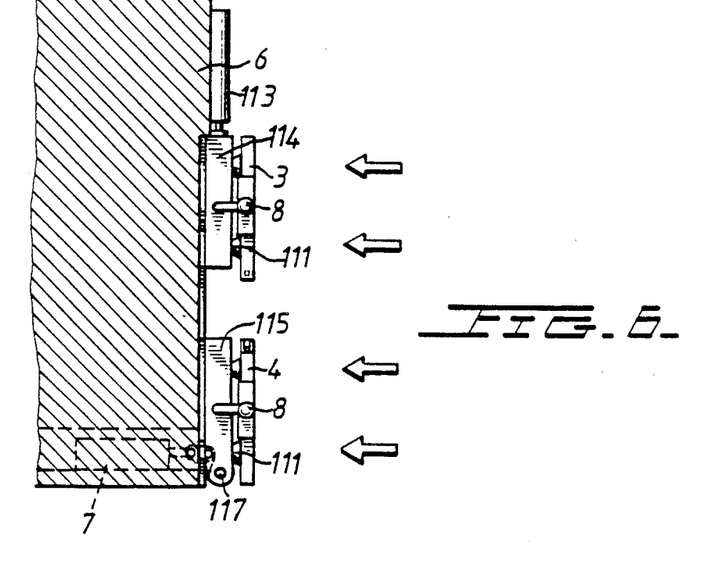
FIG. 6 is a schematic side view showing the assembly of the male case member and the female case member of the case, in which the two case members are in a pre-assembled condition.

FIG. 13 shows the formation of the male case member 3 and the female case member 4 in the injection mold 20 which includes a first mold part 26 and a second mold part 28. Conventionally, the injection molding machine 2 injects material into the injection mold 20 to form the male case member 3 and the female case member 4. After formation, the first and second mold parts 26 and 28 are separated. As can be seen in this figure, four male case members 3 are formed on an upper portion of the first mold part 26, and four female case members 4 are formed on a lower part of the first mold part 26. Each pair of male and female case members 3 and 4 are retained in the first mold part 26 and placed in a manner for subsequent assembly. Thereafter, referring to FIG. 2 and FIGS. 6 through 9, the robot 1 moves, under conventional control, to a position adjacent to the first mold part 26 to suck the male and female case members 3 and 4, such that the male case member 3 is sucked and retained by the upper sucker seat 114, and the female case member 4 is sucked and retained by the lower sucker seat 115, as shown in FIG. 6 (the arrows in FIGS. 6 through 9 represent the direction of force applied by the air cylinders in the arm 6). Then, the robot 1 carries the male and female case members 3 and 4 to an assembling position. As soon as the male and female case members 3 and 4 are sucked and retained on the sucker seats 114 and 115, the holding arms 8 are actuated by pneumatic cylinders to engage with both sides of the male and female case members 3 and 4, to keep the male and female case members 3 and 4 in mutual parallel relationship. Alternatively, the female case member 4 and the male case member 3 may be respectively sucked by the upper sucker seat 114 and the lower sucker seat 115.

Figure 7:
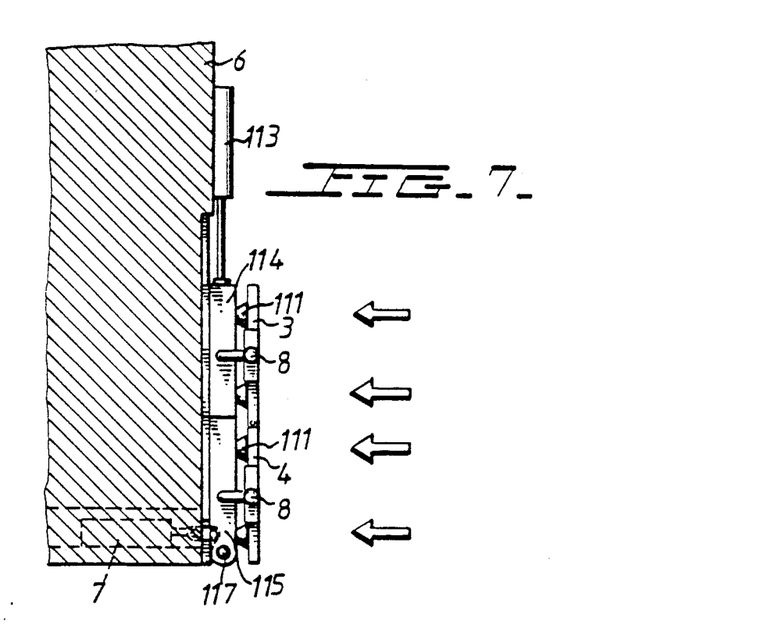
FIG. 7 is a schematic side view similar to FIG. 6, in which the two case members are engaged.

Then, the actuating bar 113 is actuated to move the upper case member (in this circumstance is the male member 3) downwards, such that the nubs 31 of the male case member 3 are guided by corresponding guiding paths 42 to engage with the corresponding grooves 41 of the lower case member, i.e., the female case member 4, as shown in FIG. 7.

Figure 8:
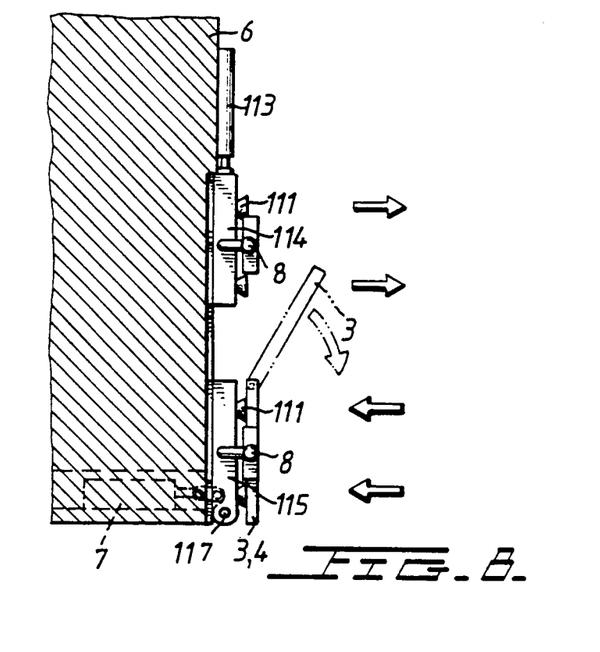
FIG. 8 is a schematic side view similar to FIG. 6, in which the upper case member is released from the upper sucker seat of the arm of the robot.

Referring to FIG. 8, after the engagement of the nubs 31 and the grooves 41, the holding arms 8 disengage with the upper case member 3, and the air cylinder on the upper sucker seat 114 blows gas to cause the upper case member 3 to move pivotally, as shown by the arrow in FIG. 8, to form a partially closed case. The actuating bar 113 moves the upper sucker seat 114 upwardly to its original position for subsequent assembly.

Figure 9:
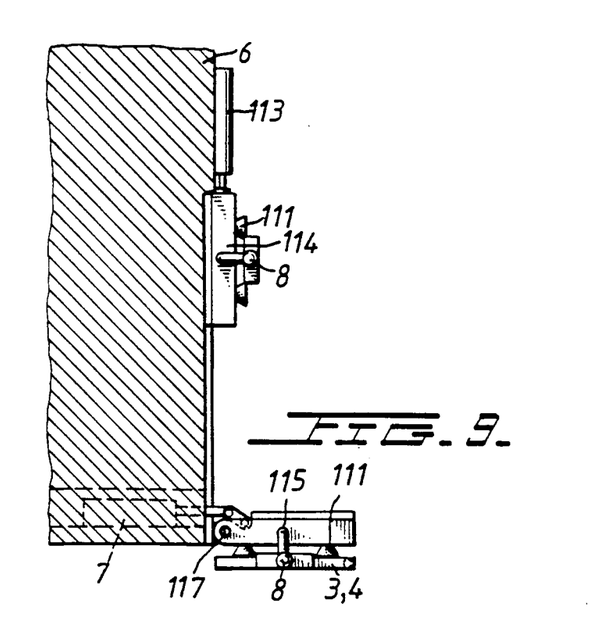
FIG. 9 is a schematic side view similar to FIG. 6, in which the lower case member is released from the lower sucker seat of the arm of the robot.

Referring to FIG. 9, a cylinder 7 in the arm 6 pushes the partially closed case such that the case is completely closed. Then, the assembled case is moved to the packaging box 5 by the robot 1. The robot 1 moves to the injection mold 20 to suck the next male and female case members 3 and 4, and carries them to the assembling position for subsequent assembly, and so on.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An apparatus for assembling plastic cases consisting of a male case member and a female case member including a robot for removing the male case member and the female case member from an injection mold, in which the male case member and the female case member are formed, an assembly head for the robot including:

an arm having a sucker assembly consisting of an upper sucker seat and a lower sucker seat, a plurality of suckers being provided on said upper and lower sucker seats, said suckers being controlled to selectively retain the male and female case members on said sucker seats or release the cases members for said sucker seats;

two parallel vertical holding arms being respectively provided adjacent to both sides of each said sucker seat; and two vertical rails being formed on said arm between said upper sucker seat and said lower sucker seat, said upper sucker seat being movable along said vertical rails under the control of an actuating bar provided on said upper sucker seat, said lower sucker seat being articulated to said arm at a lower portion thereof.

* * * * *